United States Patent [19]

Clark

[11] Patent Number: 5,734,721
[45] Date of Patent: Mar. 31, 1998

[54] ANTI-SPOOF WITHOUT ERROR EXTENSION (ANSWER)

[75] Inventor: James Monroe Clark, Verona, N.J.

[73] Assignee: ITT Corporation, New York, N.Y.

[21] Appl. No.: 542,052

[22] Filed: Oct. 12, 1995

[51] Int. Cl.$^6$ ............................................. H04L 9/00
[52] U.S. Cl. .................................................. 380/46
[58] Field of Search .................. 380/46, 42; 364/717

[56] References Cited

U.S. PATENT DOCUMENTS

| | | | |
|---|---|---|---|
| 4,658,094 | 4/1987 | Clark | 380/30 |
| 4,685,132 | 8/1987 | Bishop et al. | 380/46 |
| 4,809,295 | 2/1989 | Zscheile, Jr. et al. | 380/46 |
| 5,048,086 | 9/1991 | Bianco et al. | 380/46 |
| 5,438,622 | 8/1995 | Normile et al. | 380/46 |

OTHER PUBLICATIONS

Contemporary Cryptology, Gustavos J. Simmons, IEEE Press, 1992 (title page only).

*Primary Examiner*—Salvatore Cangialosi
*Attorney, Agent, or Firm*—Plevy & Associates

[57] ABSTRACT

There is disclosed encryption apparatus for generating a deterministic psuedorandom keystream of data derived from a secret key and a prearranged initial state and modulo-N adding the random data to plain text data to form a cipher text data stream to be transmitted. In order to reduce spoofing, which is the ability to alter received plain text by altering the transmitted cipher text there is means responsive to the plain text for altering a portion of the plain text data relative to corresponding cipher text data according to a permutation function which varies according to a selected keystream whereby one who does not possess said secret key cannot decrypt said cipher text and while preventing spoofing.

17 Claims, 6 Drawing Sheets

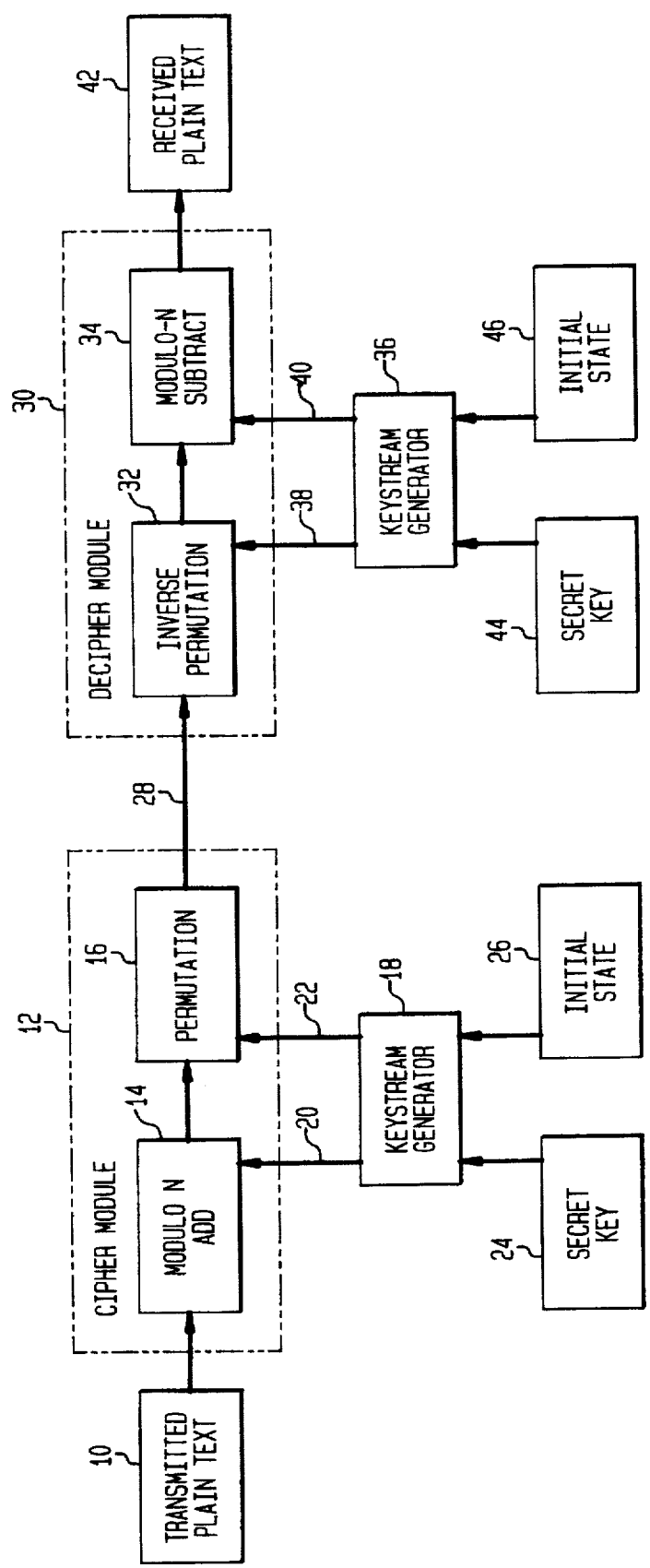

CONTINUOUS RANDOM PERMUTATION
DATA INPUTS

DATA OUTPUTS

DATA INPUTS

DATA OUTPUTS

ANTI-SPOOF WITHOUT ERROR EXTENSION (ANSWER)

FIELD OF THE INVENTION

The present invention relates to an encryption apparatus in general and more particularly to an encryption apparatus for anti-spoof without error extension.

BACKGROUND OF THE INVENTION

Encryption systems often generate a deterministic psuedorandom keystream of data bits derived from a secret key and a pre-arranged initial state, and modulo-two addition of these random data bits to the plain text data bits to form the cipher text data stream to be transmitted. For a general background of an encryption apparatus and for the use of modular arithmetic in cryptography, see U.S. Pat. No. 4,658,094 entitled "Encryption Apparatus and Method for Raising a Large Unsigned Integer To A Large Unsigned Integer Power Modulo", issued on Apr. 14, 1987 to James M. Clark, the inventor herein and assigned to ITT Corporation, the assignee herein. A source for understanding cryptographic algorithms and protocols is a book entitled "Applied Cryptography" by Bruce Schneir (John Wiley & Sons, ISN 0-471-59756-2). See also a text entitled "Contemporary Cryptology", edited by Gustavos J. Simmons, IEEE Press ISBN 0-87942-277-7 (1992). The receiver, with the same secret key and keystream-generating algorithm, and starting with the same initial state, generates an identical keystream and modulo-two subtracts, in this case, identical to addition, the keystream from the received cipher text, recovering the plain text. The primary practical advantage of this commonly-used scheme is that in the usual case where the communications channel introduces errors, the recovered plain text will have exactly the same number of bit errors as the number of bit errors of the received cipher text. This is a property of modulo-two addition and subtraction. Thus, in terms of message errors, the encrypted communication mode performs as well as the unencrypted mode. That is, there is no error performance penalty paid to gain the security offered by the encryption.

But this mode of encryption has an inherent weakness. The weakness does not make it easier for a potential third party (the transmitter and legitimate receiver are the first and second parties) to steal a copy of the message, or even a partial guess, but the weakness allows a third party having access to the communication channel, the cipher text, to alter the received plain text in a predictable way by altering the cipher text. This type of attack, called spoofing, involves inserting bogus information into a communication link, as opposed to stealing information from the link. For example, the attacker might know the format of routine messages, and by altering corresponding parts of the cipher text, might alter money amounts in the messages while allowing the remainder of the messages to appear normal and acceptable, thus damaging the recipient's financial records.

This weakness is present because there is a one-to-one fixed correspondence of plain text bits to cipher text bits. Thus, the attacker can alter selected bits of the received plain text, even through he is unable to determine the status of these bits before or after the changes. Because the spoofer can make small, carefully aimed alterations, the damage may go undetected.

Alternatively, other encryption schemes operate on larger blocks of data at a time, in contrast to one bit at a time. If the scheme is cryptographically strong, changing just one bit of a block of cipher text will change the received plain text block in such a way that, from the point of view of someone without knowledge of the secret key, all other block values are equally probable. With increasing block size, the would-be spoofer has less and less control, or ability to select parts of the message that will change. He is left with the choice of either making no changes and retreating, or making such large changes that it is obvious to the recipient that the received messages are not valid.

The largest possible change is to obliterate the entire message, which requires brute force rather than cleverness, but no encryption scheme prevents someone from cutting a communication link. This is fundamentally a different kind of attack which may delay messages or force the messages to re-routed or re-transmitted messages, but it does not damage any messages.

Block encryption schemes impose a penalty in error performance. Since changing just one bit of a cipher text block makes all other received plain text block values equally probable, then each of the bits of the plain text block are as likely to be a one as a zero, and on average, half of the bits will change. Thus, for blocks larger than two bits, there will be more bit errors in the received plain text than in the cipher text. If the block size were 100 bits, for example, the bit error rate would be increased 50-fold. This penalty is affordable only for communication links that are virtually error-free, where the error correction techniques are affordable, or where the receiver can request the transmitter to repeat message blocks that are received in error. Retransmission of message blocks is not an option for one-way or broadcast communication links.

In addition to the simple cases of bit-stream and block encryption modes, there are a variety of modes, sometimes called anti-spoof modes, that provide interaction between adjacent bits or blocks, causing the data dependencies to extend over a wide range. In general, a change of one bit of cipher text will randomly change bits of received plain text over some range of bits called the error extension. Over this range of bits, the would-be spoofer, making purposeful errors to the cipher text, has no control over where the errors will occur in the plain text, no ability to aim the damage, but over the same range, the channel, making accidental errors due to natural noise, causes a greater number of errors to spread.

In reviewing the history of encryption schemes, much of it not available to the general public, it would appear that there is a necessary trade-off, requiring a greater penalty of plain text error rate for increased anti-spoof protection.

It is, therefore, an object of the present invention to provide an encryption scheme that penalizes a would-be spoofer of purposely-inserted errors without also multiplying the accidental errors caused by a noisy channel.

SUMMARY OF THE INVENTION

Encryption apparatus for generating a deterministic pseudorandom keystream of data derived from a secret key and a prearranged initial state, and modulo-N add said random data to plain text data to form a cipher text data stream to be transmitted, in combination therewith apparatus for reducing "spoofing" which is the ability to alter received plain text by altering the transmitted cipher text, where N is a positive integer greater than one comprising means responsive to said plain text data for altering a portion of said plain text data relative to a corresponding cipher text data according to a permutation function which varies according to a selected keystream, whereby one who does not possess said secret key cannot decrypt said cipher text, while preventing "spoofing" from effecting said data stream.

BRIEF DESCRIPTION OF THE FIGURES

The above objects and further features and advantages of the invention are described in detail below in conjunction with the drawing, of which:

FIG. 1A is a block diagram of an encryption system according to this invention;

DETAILED DESCRIPTION OF THE INVENTION

Figure 1B:
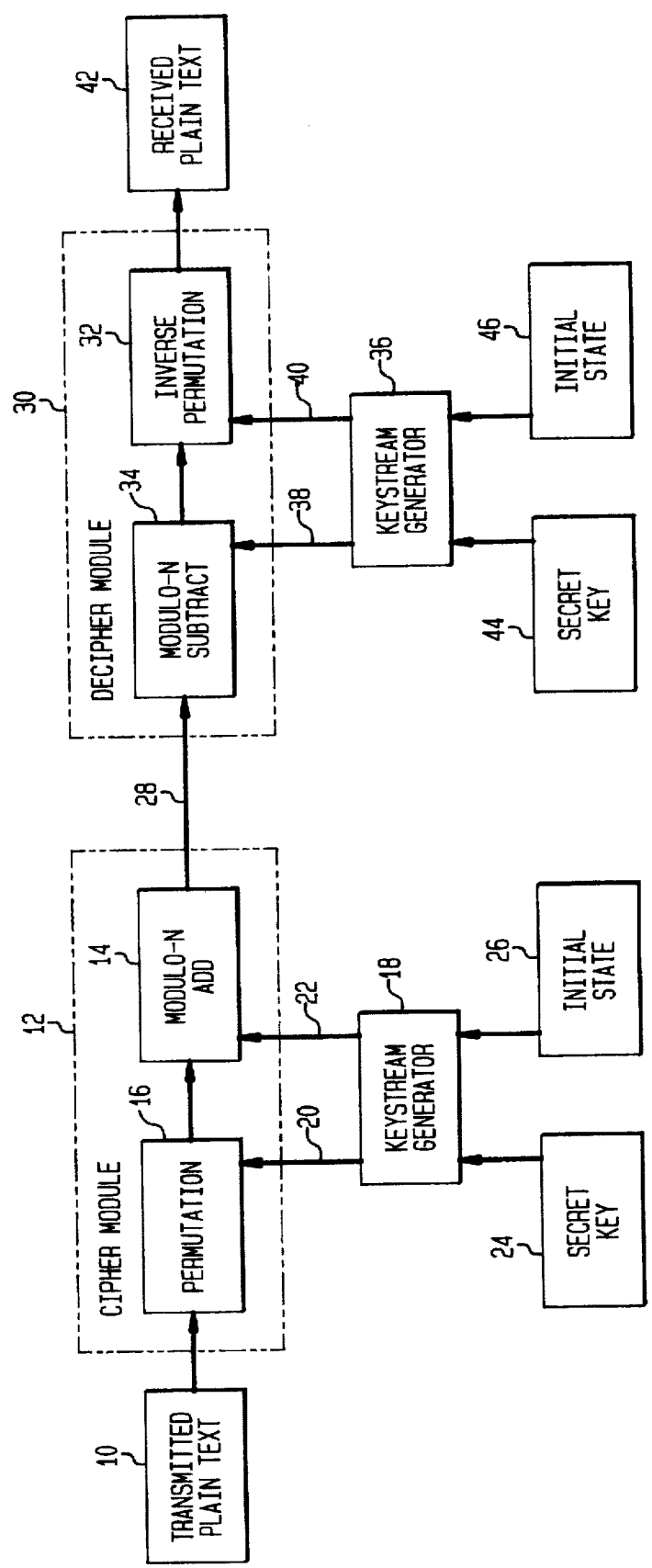
FIG. 1B is a block diagram of an alternate embodiment of this invention.

It is actually possible to add unlimited anti-spoof protection without any increase of the plain text error rate.

Anti-spoof without error extension can be added to an encryption scheme that modulo-two adds a keystream to the plain text, as described above, by making the positions of the plain text bits relative to the corresponding cipher text bits, or vice versa, a function that is unpredictable to any one without knowledge of a secret key. Basically, this requires a permutation function, to alter the sequence of the bits, that is varied by some keystream, bits that depend on the secret key. This concept leads to the two configurations which are essentially equivalent in performance.

Referring to FIG. 1A a first configuration of the present invention is shown. Transmitted plain text 10 and the keystreams 20, 22 produced by the keystream generator 18 are input to the cipher module 12 which provides cipher text 28. The cipher module 12 is comprised of a modulo-N add 14 element and a permutation element 16. The modulo-N add 14 element performs a modulo-N addition of the transmitted plain text 10 and the keystream 20 produced by the keystream generator 18. The output of the modulo-N add 14 element and the keystream 22 are input into a permutation element 16 which produces the cipher text 28 for transmission.

The cipher text 28 and keystreams 38, 40 from a second keystream generator 36 are input to the decipher module 30. The decipher module 30 is comprised of an inverse permutation element 32 and a modulo-N subtract 34 element. The inverse permutation element 32 takes the cipher text 28 and the keystream 38 to produce an output. The output of the inverse permutation element 32 and the keystream 40 are modulo-N subtracted by the modulo-N subtract element 34 which produces the received plain text 42.

The keystream generators 18, 36 produce keystreams of bits in response to a secret key 24, 44 and an initial state 26, 46.

Referring to FIG. 1B a second configuration of the present invention is shown. Transmitted plain text 10 and the keystreams 20, 22 produced by the keystream generator 18 are input to the cipher module 12 which provides cipher text 28. The cipher module 12 is comprised of a permutation element 16 and a modulo-N add 14 element. The transmitted plain text 10 and the keystream 20 are input into a permutation element 16 to produce an output. The modulo-N add 14 element performs a modulo-N addition of the output of the permutation element 16 and the keystream 22 produced by the keystream generator 18.

The cipher text 28 and keystreams 38, 40 from a second keystream generator 36 are input to the decipher module 30. The decipher module 30 is comprised of a modulo-N subtract 34 element and an inverse permutation element 32. The cipher text 28 and the keystream 38 are modulo-N subtracted by the modulo-N subtract element 34 which produces an output. The inverse permutation element 32 takes the output of the modulo-N subtract element 34 and the keystream 40 to produce received plain text 42.

Essentially, the only difference in the first configuration shown in FIG. 1A and the second configuration shown in FIG. 1B is the sequence of the modulo-N add 14 element and the permutation element 16 within the cipher module 12 and the sequence of the modulo-N subtract element 34 and the inverse permutation element 32 within the decipher module 30. Both require keystream input, where the keystream at the receiver must match the keystream at the transmitter. To avoid the possibility of weakening the cryptographic strength of the system, the modulo-N addition and permutation functions are shown with separate keystreams. This implies that the keystream generator must generate more keystream when the present invention anti-spook without error extension encryption is added to the system.

While the case of modulo-two addition has been discussed, the more general case of modulo-N addition is shown in the configuration diagrams in FIGS. 1A and 1B. This is done to close a gap left between the extremes of encrypting one bit at a time with modulo-two addition, one-bit blocks, and encrypting one block at a time, with blocks larger than two bits.

Modulo-N addition is, in general, a form of block encryption. For example, since two-bit blocks have four possible values, they can be encrypted with modulo-four addition. For four blocks larger than two bits, there will be more bit errors in the received plain text than in the cipher text. It happens that if modulo-four addition is used to encrypt two-bit blocks, that there will not be more bit errors in the received plain text than in the cipher text provided that Gray code, or the equivalent, is used to assign numeric values to the two-bit blocks.

Figure 2:
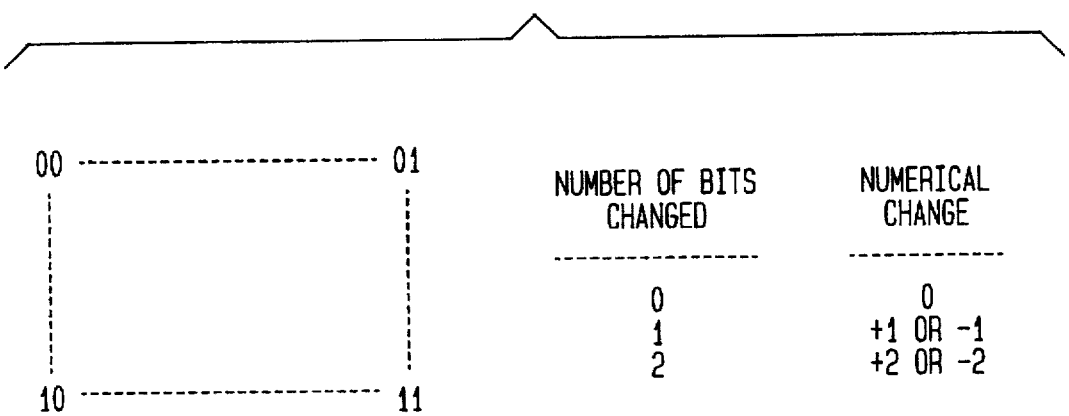
FIG. 2 is a table useful in explaining error rate variation.

In general, if the two-bit values are arranged in a loop as shown in FIG. 2, where the numerical values are considered to increase by one (modulo four) in one direction around the loop, and these numerical assignments are used for the modulo-four addition and substraction, such a code is a Gray code equivalent, and this is necessary and sufficient for the error rate of the received plain text to be the same as the error rate of the cipher text.

Using the table shown in FIG. 2 it can be seen that the error rate is not increased by modulo-two addition or subtraction. First, one can verify that the table is correct by examination of the loop diagram. For example, changing one bit of any two bit block, the result will always be an adjacent block in the loop diagram, which by definition increases or decreases the numeric value by one. Conversely, changing any numeric value by one in either direction, the block code representing the numeric value will always change in exactly one bit position. Secondly, these changes always propagate exactly through the modulo-two operations of addition and subtraction. For example, if the cipher text input to the receiver's modulo-two subtractor is changed by one bit (accidently or purposely), then its numeric value is changed by plus or minus one, and then the numeric result of the subtraction is changed by plus or minus one, and then this result, the received plain text, is changed in one bit position.

Notice that without knowing what keystream value was subtracted, which bit position is changed can not be specified. Thus, since the spoofer does not know the keystream and cannot control which received plain text bit will be changed. Thus, this form of modulo-four encryption provides a small degree of anti-spoof protection.

Thus, in the two configurations shown in FIGS. 1A and 1B, N can be either 2 or 4, provided that in the case of N=4, that "Gray code equivalent" encoding (assignment of numeric values) is used. Next, it is necessary to demonstrate workable permutation functions that can extend the "range of uncertainty" over which the spoofer is unable to control the position of received plain text errors.

A crucial element of anti-spoof without error extension is finding workable permutation functions. For example, the following is a portion of a continuous random permutation of a bit sequence, the bits are represented by single-letter names.

input a b c d e f g h i j k l m n o p q r s t u ...

Output b d c a g h f e j l n k i m p r t s o q u ...

The gaps at the left and right of the output sequence are presumed to be filled by preceding and following bits of the input sequence. Since time progresses from left to right in this presentation, notice that no bit can be moved to the left, because this would represent negative delay, implying that the mechanism producing the output would need to know the input before it arrived. But avoiding the practicalities of processing time, we allow that bits such as b and n can be output immediately.

It is clear that random permutation of bits will involve random delays of the bits, but the delays must be constrained by the requirement that no two bits can be moved into the same position, nor can any positions be left vacant, except possibly at the beginning and end of a transmission. Furthermore, what is need is not a fixed permutation such as illustrated above, but a scheme, or schemes, for producing variable permutations, where the permutations vary in response to random keystreams input. In addition, because the purpose is to thwart the intentions of a possible spoofer, the variable permutations should have the property that all of the output positions for each input bit will be equally probable, provided that all of the keystream sequences are equally probable, from the point of view of unknown key. Also, even though it is apparent that the motion of one bit cannot be independent of the motion of the other bits, it would be desirable, for cryptographic strength, that if the spoofer knew or hypothesized the motion of one bit, that this would not infer much information, if any, about the possible motions of the other bits.

Given the strange behavior of the mathematics, finite algebra, that describe the interaction of permutations, the above requirements seem to pose a difficult problem.

The solutions to the problem take two forms: block solutions which are analogous to block codes and stream solutions which are analogous to convolutional codes.

For block solutions, the data can be collected into N-bit blocks by repeatedly filling an N-bit shift register and each block then permuted under control of a suitable number of keystream bits. The data will be uniformly permuted if all permutations are equally probable. However, there are N! (N factorial) ways to permute N bits, but M keystream bits have $2^M$ (2 to the M'th power) combinations. The only way to have these permutations equally probable is to make $N!=2^M$. But the only choices of N and M for which $N!=2^M$ is N=2 and M=1 ($2!=2=2^1$). That is, 2-bit blocks are permuted under control of one keystream bit each. This is a very limited solutions, with a very small "uncertainty range".

For larger blocks, we can use less than all of the possible permutations, equal to a power of two (to match the number of keystream bit combinations), but how can the permutations be chosen so that the bit motions have uniform probabilities and so that the motion of one bit infers little about the other bits? And what arrangement of logic circuits will efficiently permute the data bits uniformly and will efficiently translate the keystream bits to vary the permutations?

Figure 3:
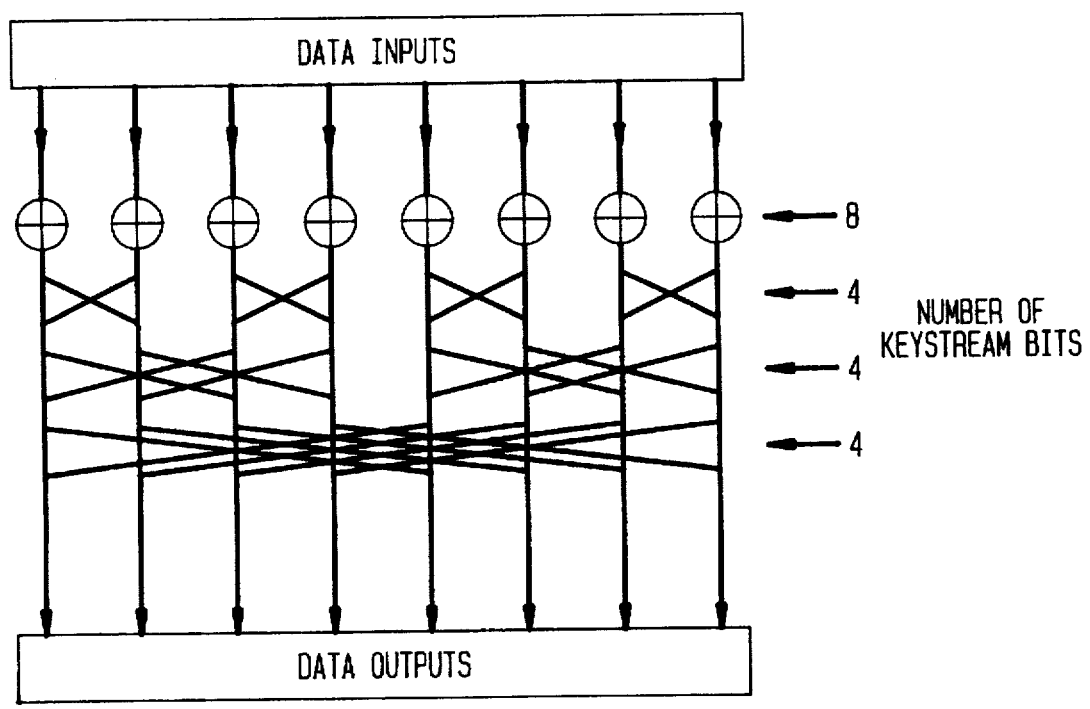
FIG. 3 is a diagram useful in explaining the encryption operation.

FIG. 3 shows an example of how to permute an 8-bit block uniformly. Although an 8-bit block is used as an example, it should be clear that the descriptions and principles and observations below apply equally to blocks $2^N$ bits in general.

Assume that the input bits have been shifted into an 8-bit register (not shown). The top layer of the diagram shows the 8 data bits being modulo-two added (exclusive-ORed) with 8 keystream bits (doing the encryption first, as shown in FIG. 1A). In the three remaining layers of the diagram, an X symbol represents a conditional swap operation, which is a variable 2-bit permutation. That is, two multiplexer circuits are used to swap or not swap a pair of bits as controlled by a keystream bit. In the first of the swap layers, the 8-bit block is divided into four 2-bit blocks, and the bits in each 2-bit block are conditionally swapped. In the next swap layer, the 8-bit block is divided into two 4-bit blocks, and within each 4-bit block two interleaved pairs of bits are conditionally swapped. In the last swap layer, four interleaved pairs of bits are conditionally swapped. On the right side of the diagram, the number of keystream bits needed to independently control each element of the logic circuit is indicated. Eight keystream bits are needed for the encryption part, and 12 for the permutation (anti-spoof) part in this example.

Notice that in the first swap layer, the swaps move the bits a distance of one to the left or right; in the second swap layer, the swaps move the bits a distance of two; and in the third layer, a distance of four. As in the case of 3-bit binary integers, where the significance of the bits are one, two, and four, here also the span of values is eight. That is, each input bit can be moved to any one of the eight output bit positions, and (analysis shows) with equal probabilities.

If the motion of one of the data bits were known, then this amounts to knowing 3 of the 12 keystream bits, which control 3 of the 12 swap functions, which partly control other bits. In the case, for example, that it were known that bit 2 moves to bit position 8, this would limit the motion of input bit 1 (which shares the first swap function with input bit 2) to four of the eight output positions, and would limit the motion of output bit 4 (which shares the last swap function with output bit 8) to four of the input bit positions. A middle swap function is also shared, but it is not known whether this limits input bit 3 or 4, or limits output bit 2 or 6. This example should make it clear that in general, the infrared knowledge is dispersed, and thus difficult to consolidate into complete knowledge of other bits.

It is easy to see that the appropriate circuit for the receiver, to reverse the operation of the transmitter's circuit and thus to recover the data in its original form, looks like the diagram of the transmitter's circuit turned upside-down. That is, we simply do the same operations in reverse order. Doing the same operations again is appropriate because the swap and modulo-two operations are each their own inverse operation. That is, if we modulo-two add keystream bit K to input bit I, getting output bit O, and repeat this (at the receive end): modulo-two add keystream bit K to bit I, then we will get a duplicate of the original bit I. Likewise, if we swap a bit pair I1, I2 only when keystream bit K is a one, getting output pair O1, O2, and repeat this: swap pair O1, O2 when K=1, then we will get a duplicate of the original pair I1, I2.

The various layers of processing can be done in any sequence, as long as the receiver's sequence is the reverse of the transmitter's sequence.

The modulo-two addition layer and the swapping-of-2-bit-blocks layer can be replaced by a layer of modulo-four additions (subtractions at the receiver) as described earlier. This integrated layer does the encryption (decryption) and also has a property equivalent to the swap layer, in that, with equal probabilities, a change of one input bit will change one output bit or the other. This replacement is advantageous because less keystream bits are needed. In this case of the 8-bit block illustrated, 8 keystream bits are needed for the integrated layer instead of 12 for the separate layers. It might seem that some cryptographic strength must have been diminished by using less keystream bits; but further examination shows that the separate swap layer is inefficient in that it sometimes (half of the time) swaps identical bits, thus accompanying nothing, whereas the swap-like behavior observed in the modulo-four operation is always between bits with different values.

It should also be obvious that in general, for a block size of $2^M$ bits, that there needs to be M swap layers, arranged in the various sub-block sizes as illustrated in the example.

Uniformly variable permutations in a continuous or stream mode can also be provided. This is most easily done by first dividing the odd and even bits of the data into separate streams before processing; then combining the two streams afterward. Since the process of dividing and combining the odd and even streams is trivial, and well known to one ordinarily skilled in the arts, these operations are not shown. These operations are equivalent to arranging the data in two-bit blocks.

Figure 4:
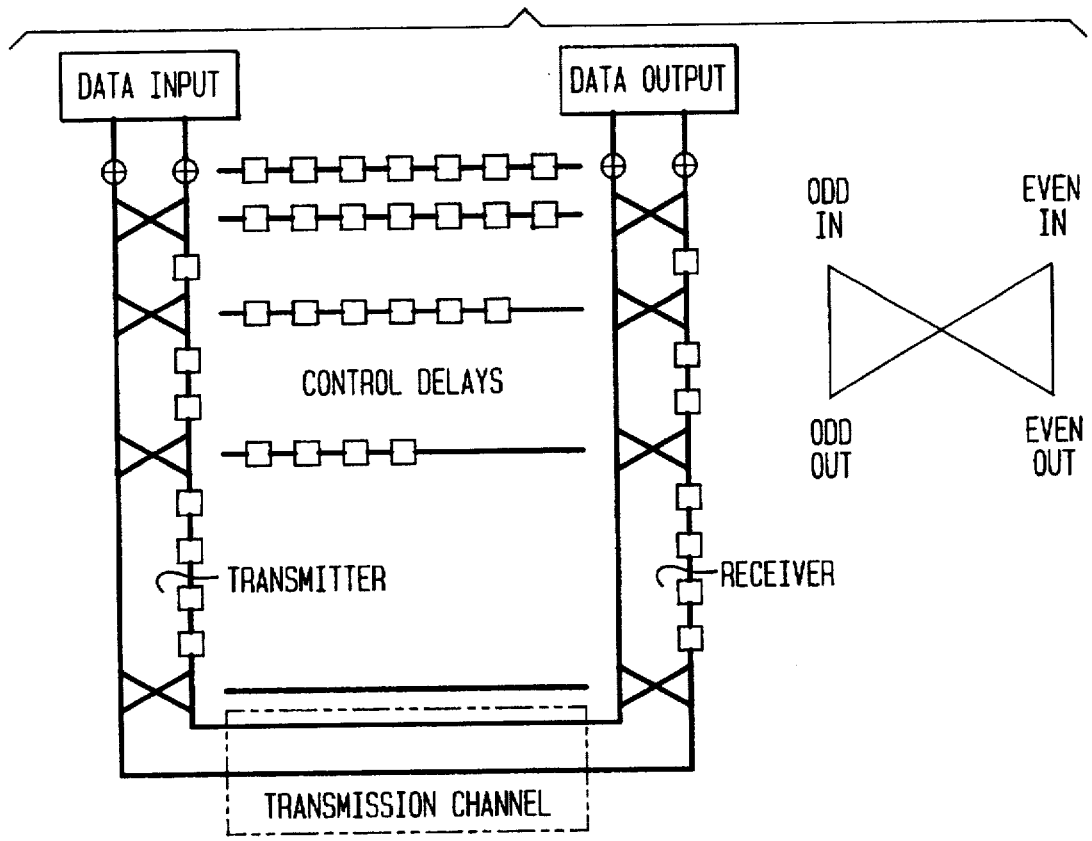
FIG. 4 is a diagram useful in explaining an encryption process according to this invention.

In FIG. 4 a pair of data streams are shown side-by-side, which may be processed, two bits at a time. There is shown an overview. The keystream inputs are not shown explicitly; these are implicit, because one keystream bit is needed to control each elementary operation, swap, or modulo-two addition.

The over-all flow is downward on the left side (the transmitter's circuit), across the bottom (the transmission channel), and upward on the right (the receiver's circuit). In the center of the diagram, it appears that we are also transmitting control bits, but actually, we are just visually comparing the timing of the transmitter's control (keystream) bits to the receiver's corresponding bits.

First, a keystream bit is modulo-two added to each input bit (the basic encryption operation), then the pair of bits are conditionally swapped. Then, using a one-bit register, the right-hand stream is delayed while the left-hand stream continues without delay. (Since operations occur at two-bit block intervals, the delay of each register bit is really two bit intervals.) After another conditional swap, we again delay the right-hand stream, but with twice the previous delay. We can repeat this pattern, with increasing delays as far as we like. In the example diagram, we stop after a delay of four, with one final swap.

The smaller diagram on the right summarizes what is accomplished by the transmitter's permutation logic. Depending on which combination of swaps are enabled, data can flow from the odd and even inputs to the odd and even outputs in any of the four combinations (summary paths) indicated, and these combinations are equally probable. Furthermore, in each summary path (such as off input to even output), eight delays from zero to seven are possible, with equal probabilities.

The receiver's circuit is the reverse of the transmitter's circuit. We will show layer how, in general, one can prove that a receiver's circuit will always exactly undo the processing of the transmitter. But by inspection, this is easily done for the special case that no swaps are enabled: the transmit path with zero delays connects to the receive path with a total of seven delays, and the transmit path with seven delays connects to the receive path with zero delays. Thus, the odd and even streams are delayed the same amount, and thus come out in the same sequence.

Unlike the block permutation circuit, which processed an entire block at one time, here, varying delays occur between swap operations. As a result, the timing of the swaps at the receiver cannot be the same as the transmitter, even though both transmitter and receiver must use identical copies of the keystream. The two seven-bit delays shown across the top center of the diagram indicate that the control of the modulo-two addition and of the top-most swap operation in the receiver must be delayed seven cycles (2-bit block cycles) from the corresponding operations of the transmitter. That is, assuming that the transmitter uses a certain three bits from the keystream generator to control these functions, the receiver must use the same (a copy of the) three keystream bits, but only after a delay of seven cycles. The reason for this is that ( as we will show) there is a corresponding delay in the data paths from the transmitter's control points to the receiver's control points. Even though the transmitter has inserted randomly varying delays in the data path, the receiver has inserted matching delays such that the total delay is a constant (seven, in this case). Progressing downward to the bottom of the diagram, less control delay is needed, until finally, no delay is needed between the last swap of the transmitter and the first swap of the receiver.

Figure 5:
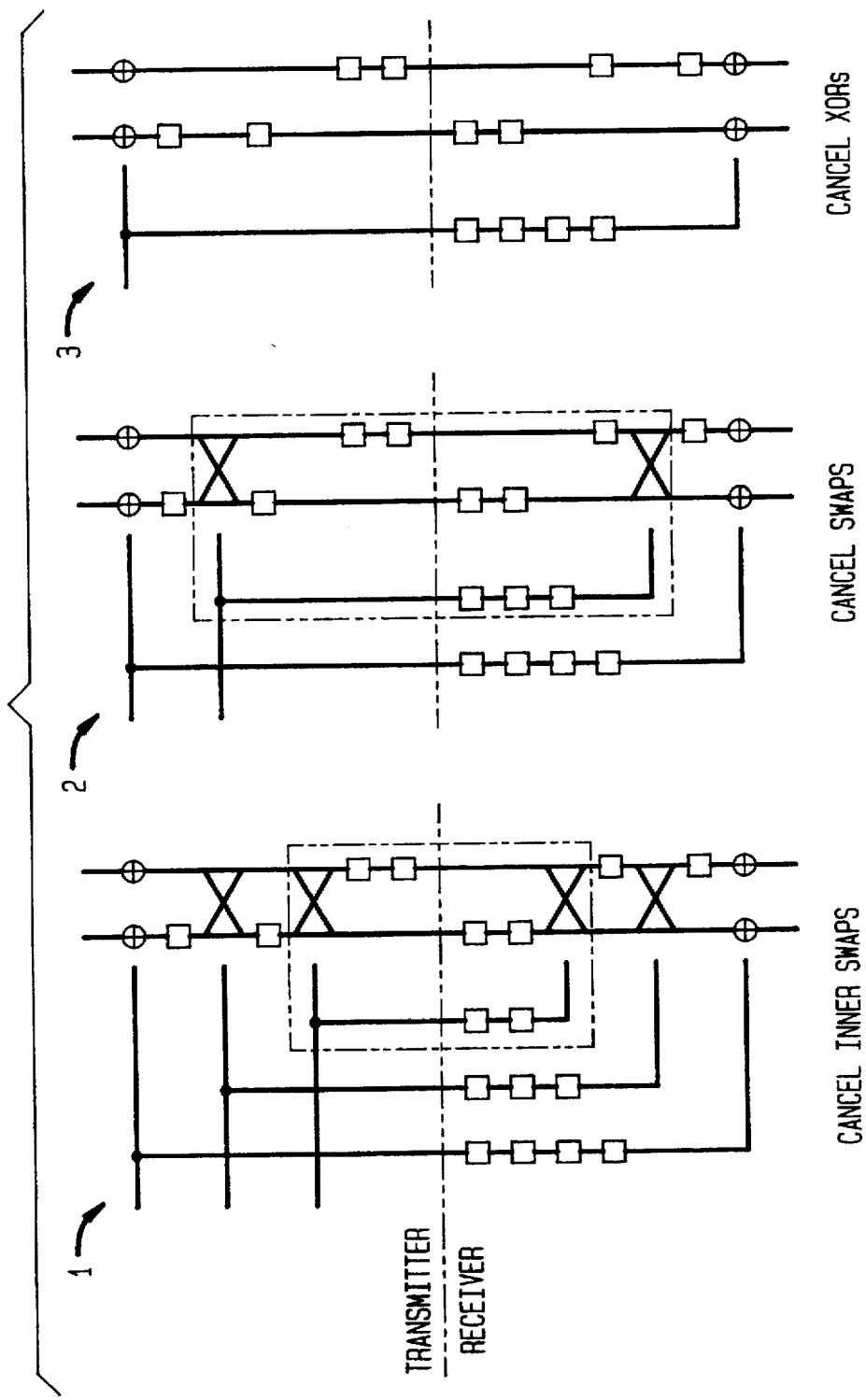
FIG. 5 is a diagram useful in explaining the operation of the encryption process.

FIG. 5 illustrates a method for proving (or disproving) that the combined processing of a transmitter circuit followed by a receiver circuit does nothing more, in sum, than to delay all data by a constant amount, thus not changing the data. Thus we show that the recovered plain text is identical to the original plain text. We do this is successive steps, shown from left to right in the diagram. For the sake of simplicity, we use simpler transmitter and receiver circuits than above. In each part of the diagram, the data flows downward, with the transmitter circuit above the horizontal broken line, and the receiver circuit below it.

In the first step, we identify an inner part, enclosed by the broken-line rectangle, consisting of the innermost corresponding swaps of the transmitter and receiver, and any intervening delays. We observe that this part of the process begins with a swap of two data bits controlled by some keystream bit. Following this, the control and both parts of the data path all have the same delay (two), followed by another swap operation with the same data and the same control. This shows that if the pair of bits are swapped in the transmitter, then two cycles later, the same pair of bits will be swapped again, with no net change. And if the transmitter does not swap the bits, then the receiver will also not swap the bits; again, with no net change.

Since this inner part does nothing but add a constant delay of two, we can remove it without changing the overall operation except to reduce the overall delay by two. (Optionally, remove delays and swaps, or just the swaps)

In the second step, we again identify an inner part, which is a swap, three delays, and another swap, and remove this part for reasons similar to those of the first step. In the last step, we have a modulo-add operation followed after four delays by a canceling modulo-add (subtract) operation, which is again equivalent to a constant delay.

This pattern of reasoning can be used in reverse to determine the receiver circuit that matches a given transmitter circuit, and to determine the proper control delays.

Notice that the stream method is generally more economical than the block method, for the same amount of antispoof protection, measured by uncertainly range (variable delay range). For example, the illustrated stream circuit provides a delay range twice that of the illustrated block circuit with one fourth as many modulo-two adders and one third as many swap circuits (pairs of multiplexers). The total number of register bits, including some for the implied (un-illustrated) blocking and unblocking operations, is about the same.

As for the block permutation circuit shown earlier, the combination of two modulo-two adders and a swap circuit can be replaced by a gray-coded modulo-four adder/subtracter.

As for the block permutation circuit shown earlier, the sequence of permutation sizes (one, two, four . . . ) can be reversed, as shown here. In this case, the total number of control delays is reduced, thus reducing the cost accordingly.

Figure 6:
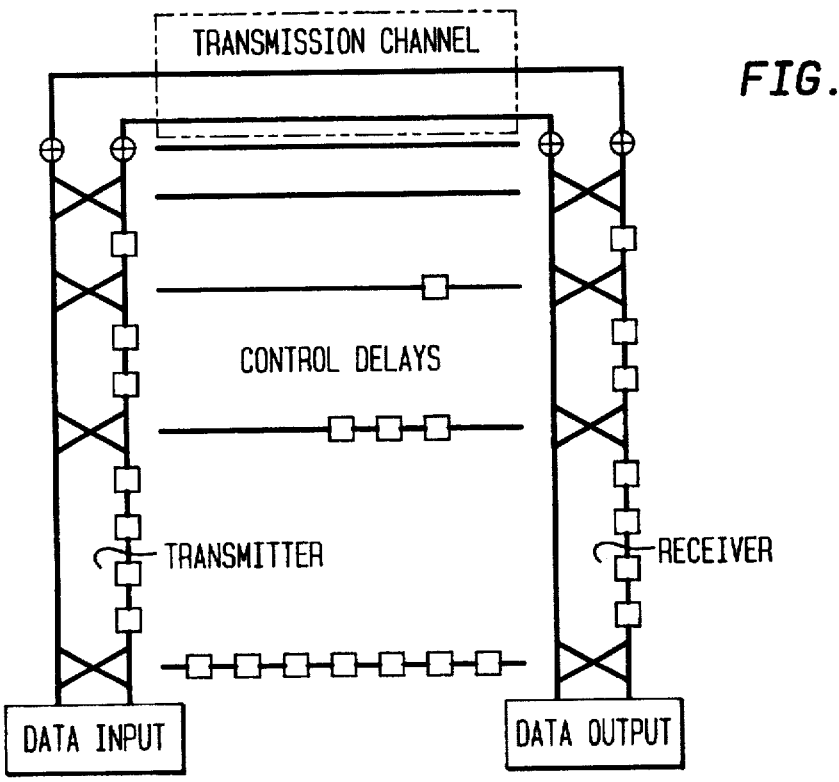
FIG. 6 is a diagram showing the permutation process

Instead of putting control delays in the receiver's circuit, control delays can be put in the transmitter (FIG. 6) such that constant delays are required at the receiver; then instead of actual constant delays, the receiver can simply delay the start of its keystream generator appropriately. This may also reduce the total cost of the control delays.

As is typical of stream-type processing circuits (such as convolutional encoders and interleavers), there is a start-up delay to fill "the pipeline" (the delay registers) and a ending delay to flush the pipeline. The usual practice is to initially fill the delay registers with arbitrary data such as zeros, and to discard this initial data when it initially "flushed out".

Comparison and Evaluation

Figure 7:
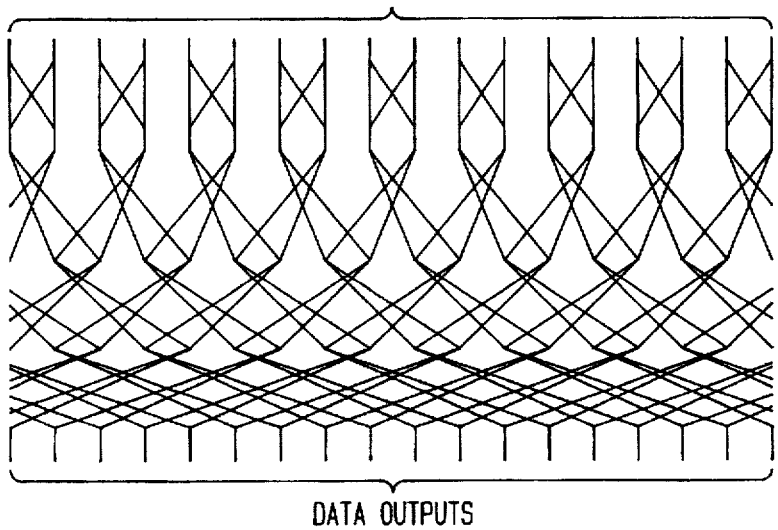
FIG. 7 is a diagram depiction of the random permutation of the receiver.

FIG. 7 depicts and visualizes the continuous random permutation of the receiver in the previous figure, using a format similar to that used for block permutation earlier. As for the block permutation, there are multiple layers of repeated swap operations, each layer having swaps with twice the span of the previous layer, but here the swaps are continuously overlapping, so that there is no place where we can stop without breaking a swap in two (starting but not finishing a swap). In practice, of course, we need to apply an offset such that the input-to-output paths that angle to the left will not represent negative delays.

Figure 8:
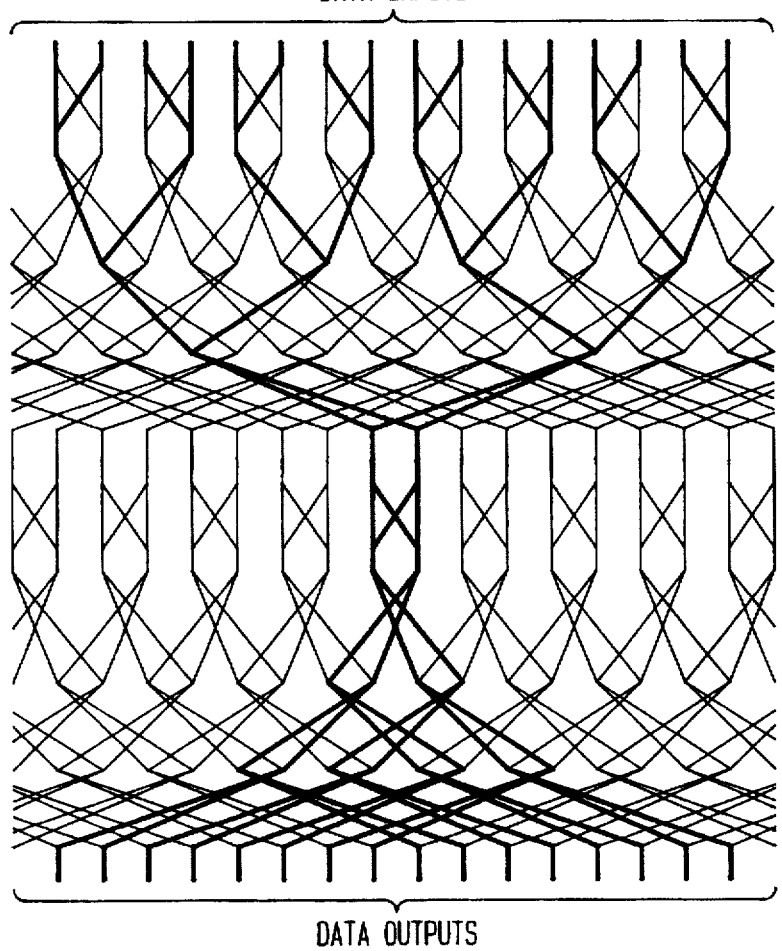
FIG. 8 is a diagram depicting the flow of encrypted data.

FIG. 8 visually evaluates the span of the variable delay that the circuit can apply to any pair of bits. The data-flow pattern of the previous diagram is repeated twice: In the upper half, we trace the possible origins of two output bits (at center) back to the inputs (top), as shown by the heavy lines. In the lower half, we trace the possible destinations of two input bits (at center) forward to the outputs (bottom). In each case, the span is 16 bits (in general, $s^n$ bits for n swap layers). And since the probabilities are equal at each fork (determined by an independently random bit), the 16 bit positions are equally probable in each case.

I claim:

1. Encryption apparatus for generating a deterministic psuedorandom keystream of data derived from a secret key and a prearranged initial state, and modulo-N add said random data to plain text data to form a cipher text data stream for transmission, in combination therewith apparatus for reducing "spoofing" which is the ability to alter received plain text by altering the transmitted cipher text, where N is a positive integer greater than one comprising:

means responsive to said plain text data for altering a portion of said plain text data relative to a corresponding cipher text data according to a permutation function which varies according to a selected keystream, whereby one who does not possess said secret key cannot decrypt said cipher text, wherein "spoofing" is prevented from effecting said data stream.

2. The encryption apparatus according to claim 1 wherein said encryption apparatus modulo two adds a keystream to the plain text by making the position of the plain text bits relative to the corresponding cipher text bits unpredictable to one who does not posses said secret key.

3. The encryption apparatus according to claim 1 wherein said encryption apparatus modulo two adds a keystream to the cipher text bits by making the positions of the cipher text bits relative to the corresponding plain text bits unpredictable to one who does not possess said secret key.

4. The encryption apparatus according to claim 1 wherein N is equal to two (2).

5. The encryption apparatus according to claim 1 wherein N is equal to four (4) and said data is data blocks indicative of block encryption.

6. The apparatus according to claim 1 wherein said means includes an N bit shift register for receiving and storing N bits of plain text data with each stored N bits indicative of a data block, permutating means coupled to said shift register, a keystream bit generator coupled to said permutating means and operable to cause said permutating means to permute each data block under control of a given number of keystream bits.

7. The apparatus according to claim 6 wherein said shift register is an 8 bit register.

8. The apparatus according to claim 2 further including multiplex means responsive to said altered plain text data for swapping bits according to said keystream.

9. The apparatus according to claim 8 wherein said multiplex means operates to swap pairs of bits.

10. A method of encrypting plain text data for generating a deterministic pseudorandom keystream of data which are derived from a secret key and prearranged initial bits, and where plain text data is added to said random data to form a cipher text data stream for transmission to an encryption receiver, comprising the steps of:

shifting N bits of plain text data for storage in a register, modulo N adding said shifted bits with N key stream bits, swapping a given number of added bits according to said keystream bits, performing said step of swapping a given number of times to provide an encrypted bit stream according to a bit permutation, wherein said bit permutation varies according to said keystream bits.

11. The method of encrypting according to claim 10 comprising the step of:

transmitting said encrypted bit stream.

12. The method of encrypting according to claim 10 wherein N is equal to two (2).

13. The method according to claim 10 where N is equal to four (4).

14. The method according to claim 10 further comprising the step of:

dividing odd and even bits of said stored plain text data into a first and second data stream Modulo two adding said even and odd bits in said streams with a keystream bit, swapping bits in said stream according to said keystream bits, delaying one stream with respect to the other stream a given amount to enable data to flow from odd to even bit inputs to odd and even outputs in encrypted combination.

15. The method according to claim 11 further comprising the step of:

decrypting said transmitted data.

16. The method according to claim 14 further including the step of:

swapping said bits in said streams after delaying said first stream with respect to said second stream.

17. The method according to claim 15 wherein the step of:

decrypting includes delaying one of said received streams.

* * * * *